Feb. 24, 1970  R. L. VALENTE  3,496,813
METHOD AND APPARATUS FOR SHEARING CONTINUOUS BILLETS
Filed June 26, 1967  12 Sheets-Sheet 1

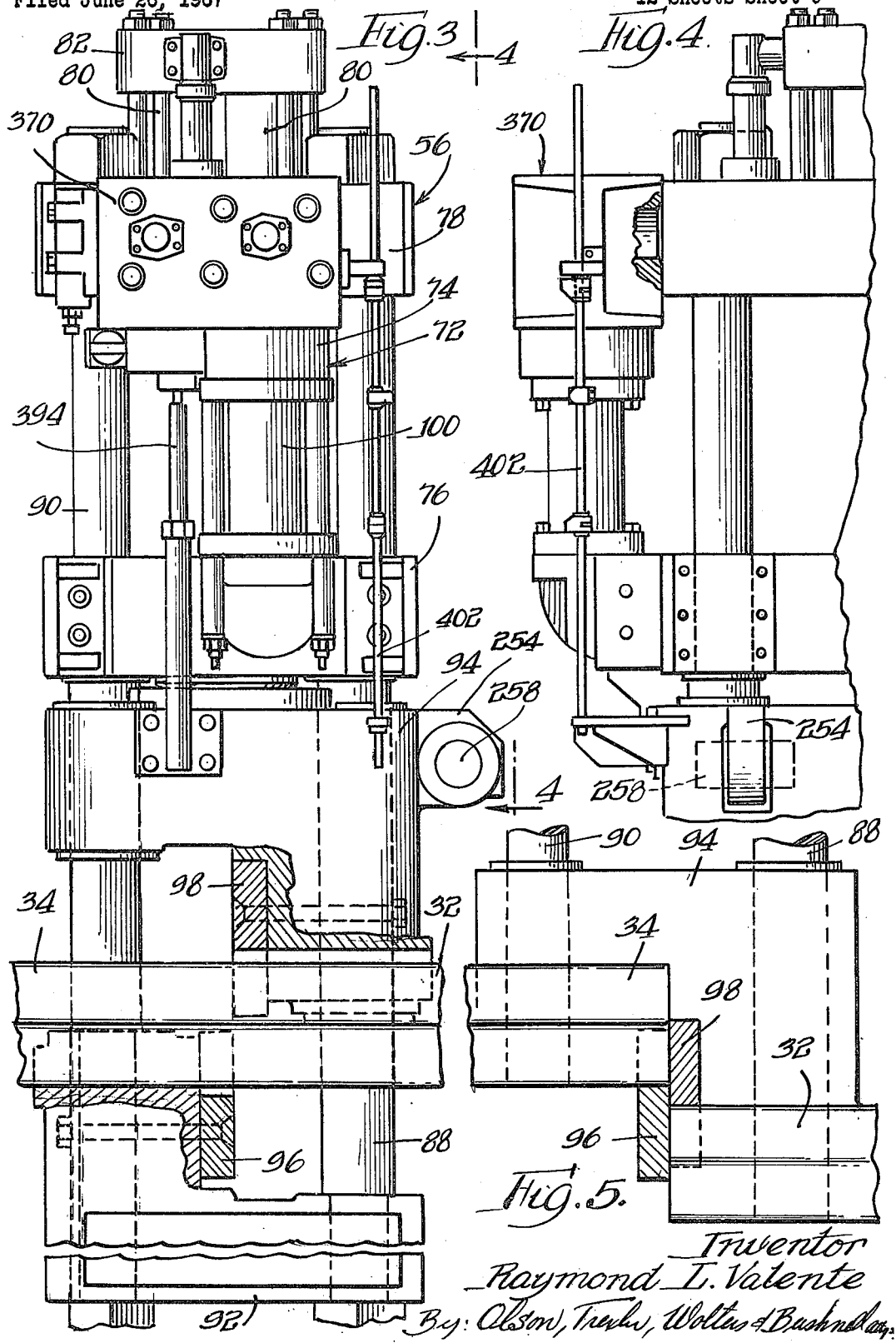

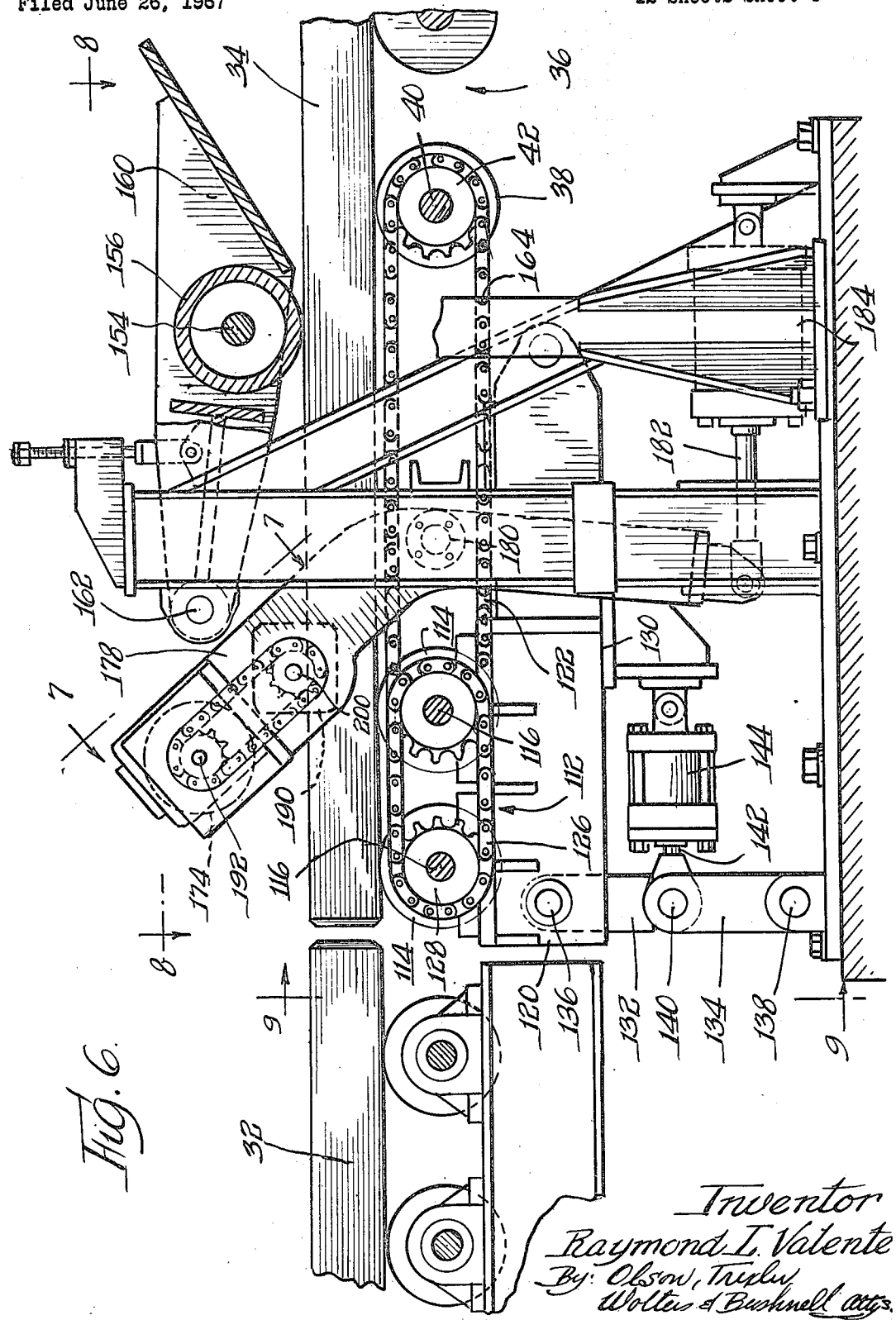

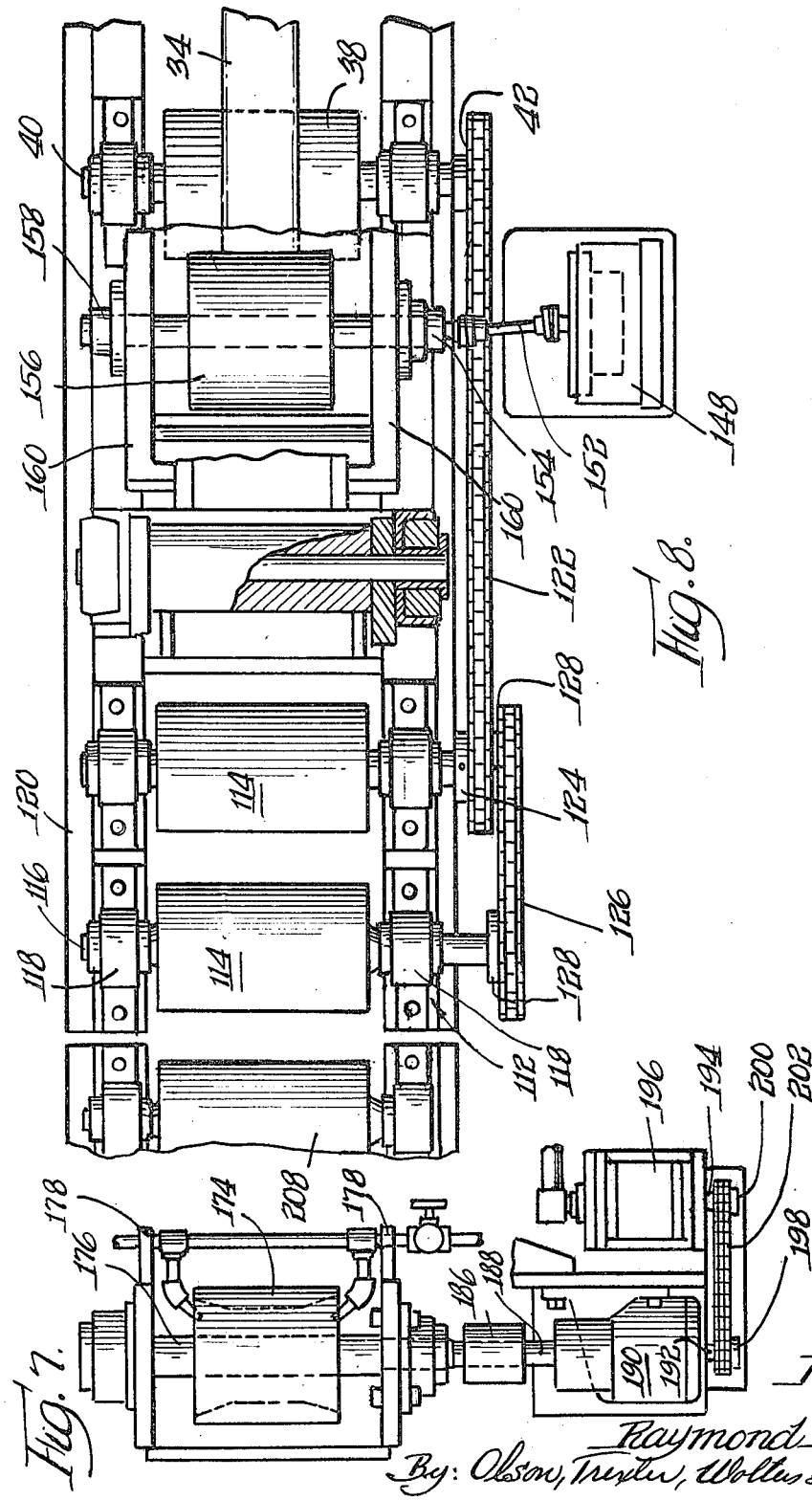

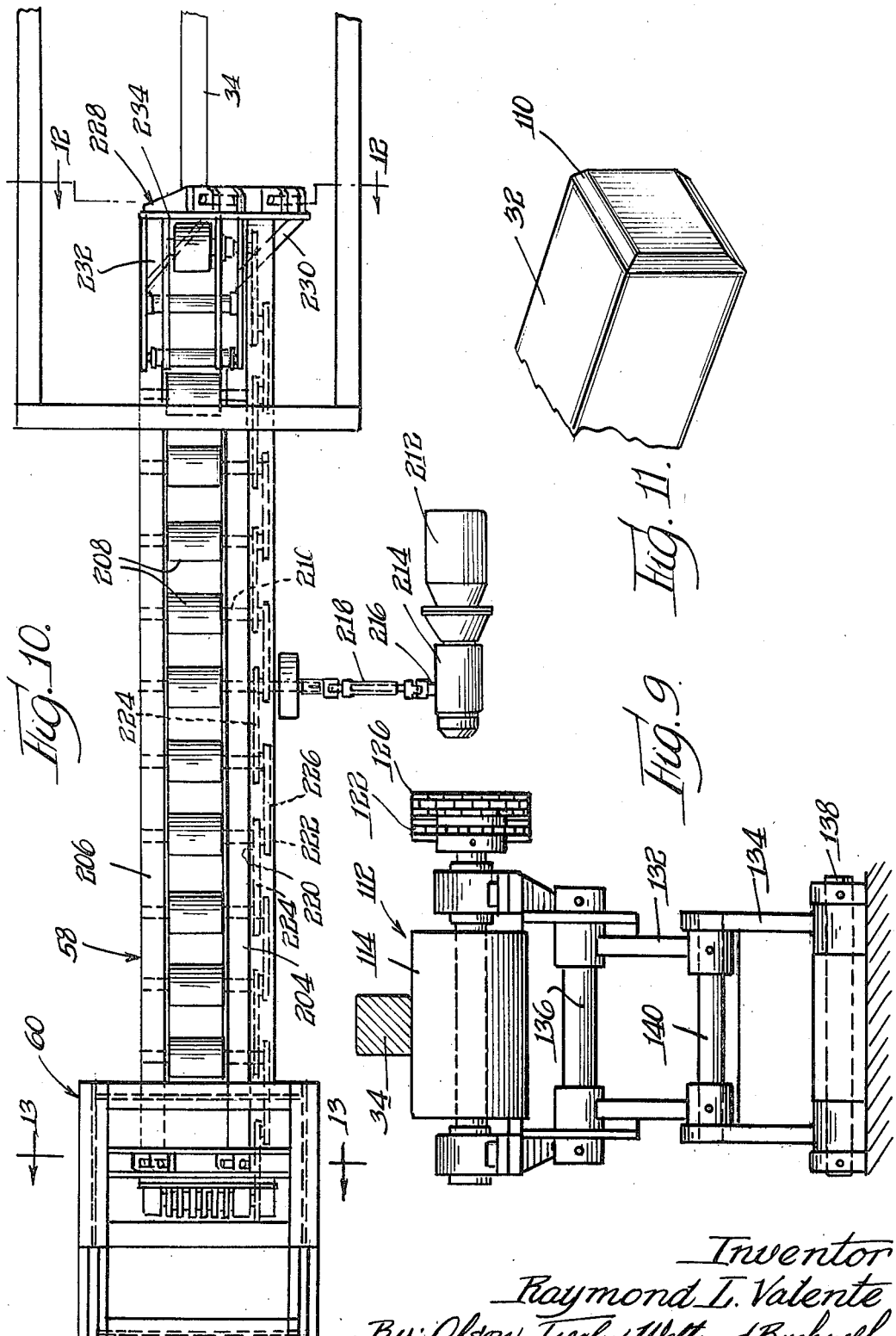

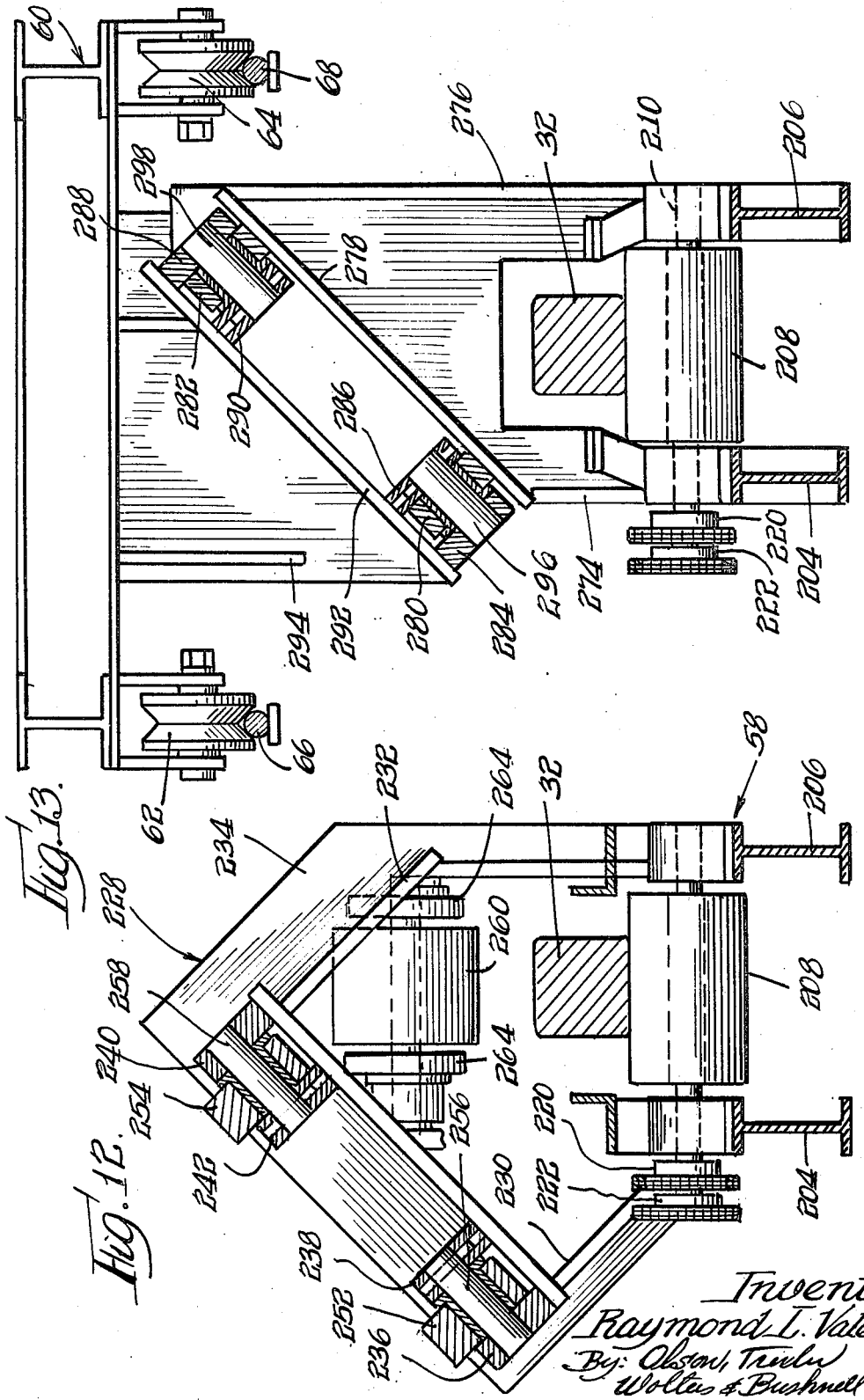

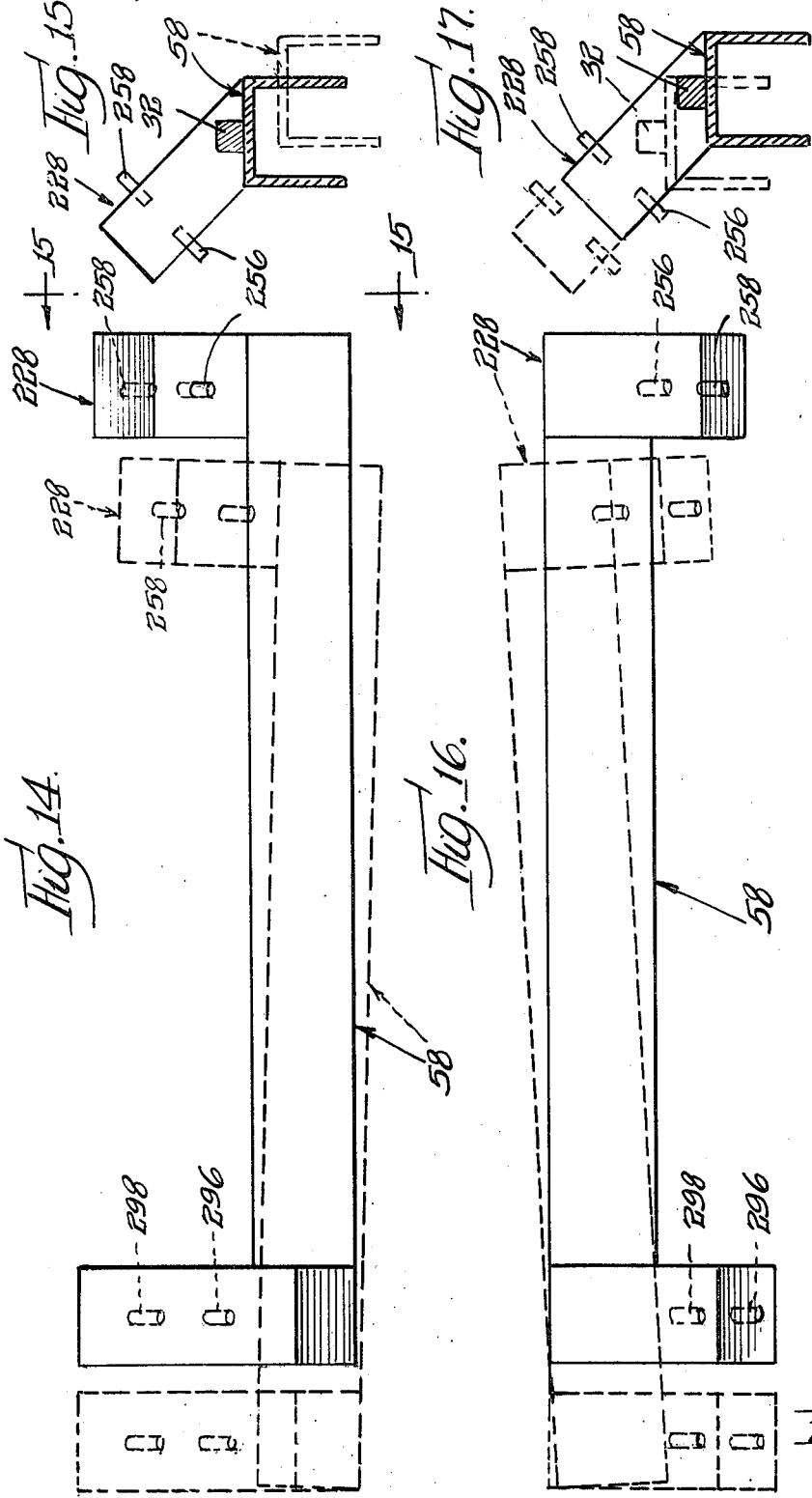

Feb. 24, 1970  R. L. VALENTE  3,496,813
METHOD AND APPARATUS FOR SHEARING CONTINUOUS BILLETS
Filed June 26, 1967  12 Sheets-Sheet 9

Inventor
Raymond L. Valente
By: Olson, Trexler, Wolters & Bushnell attys

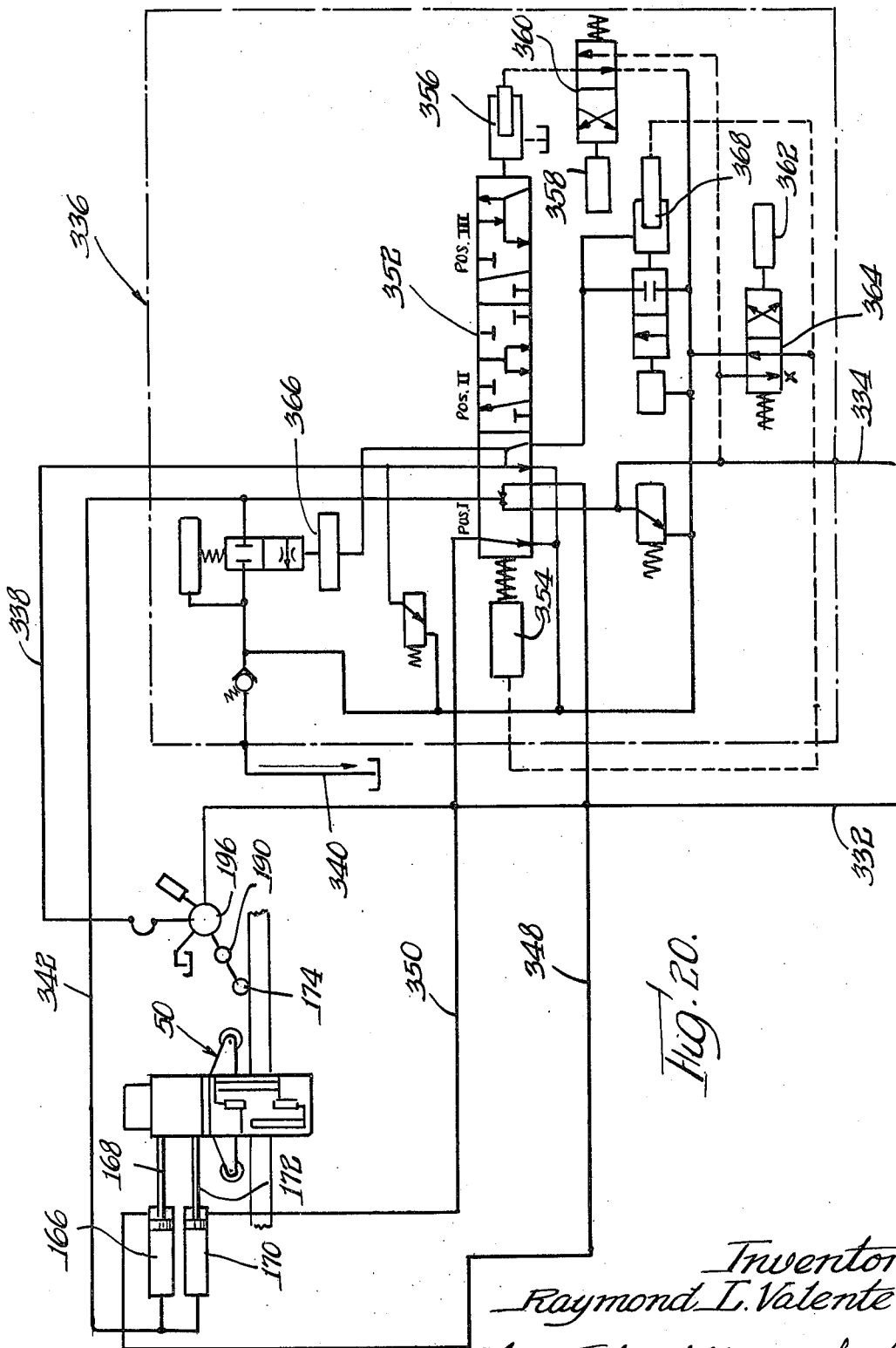

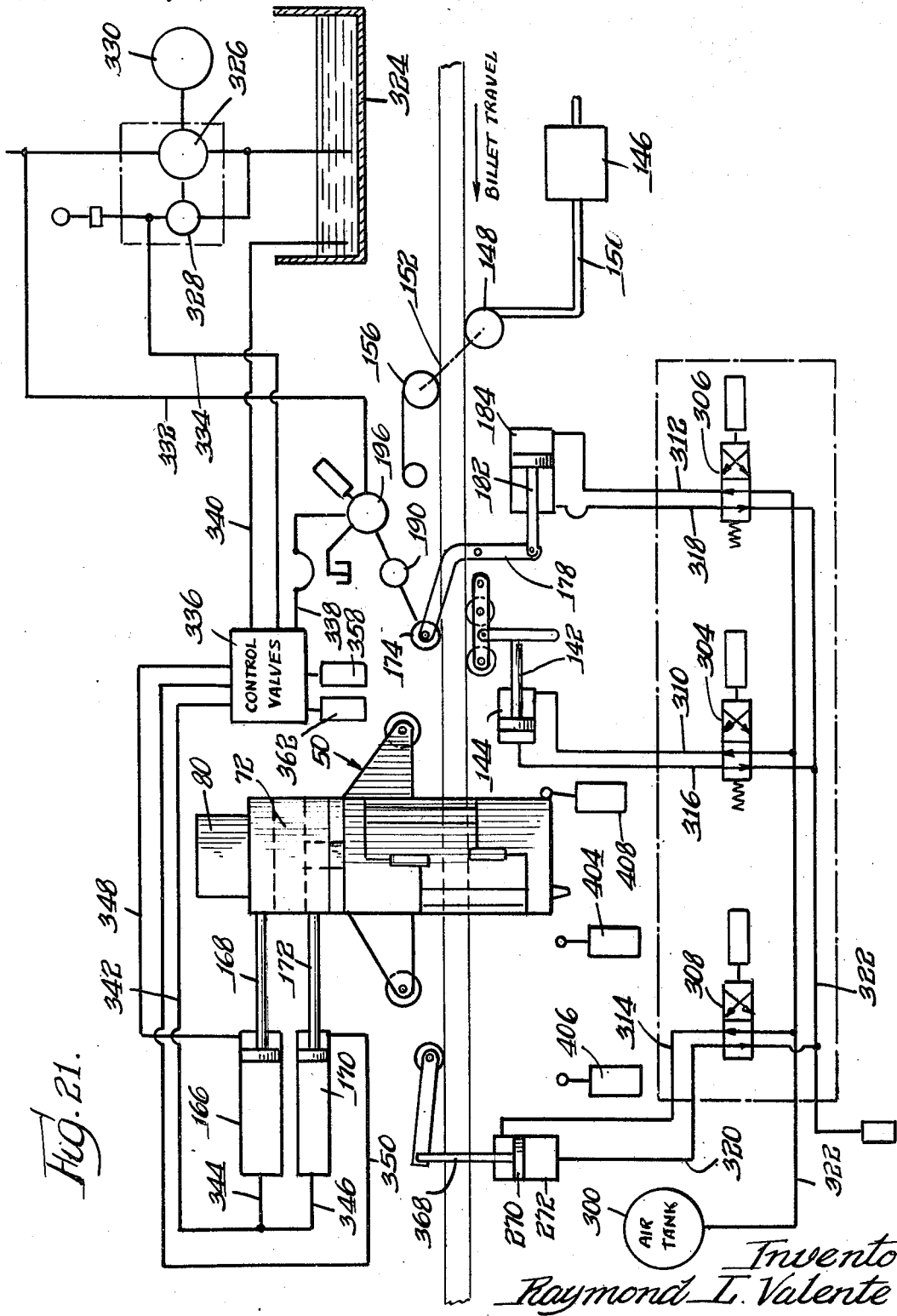

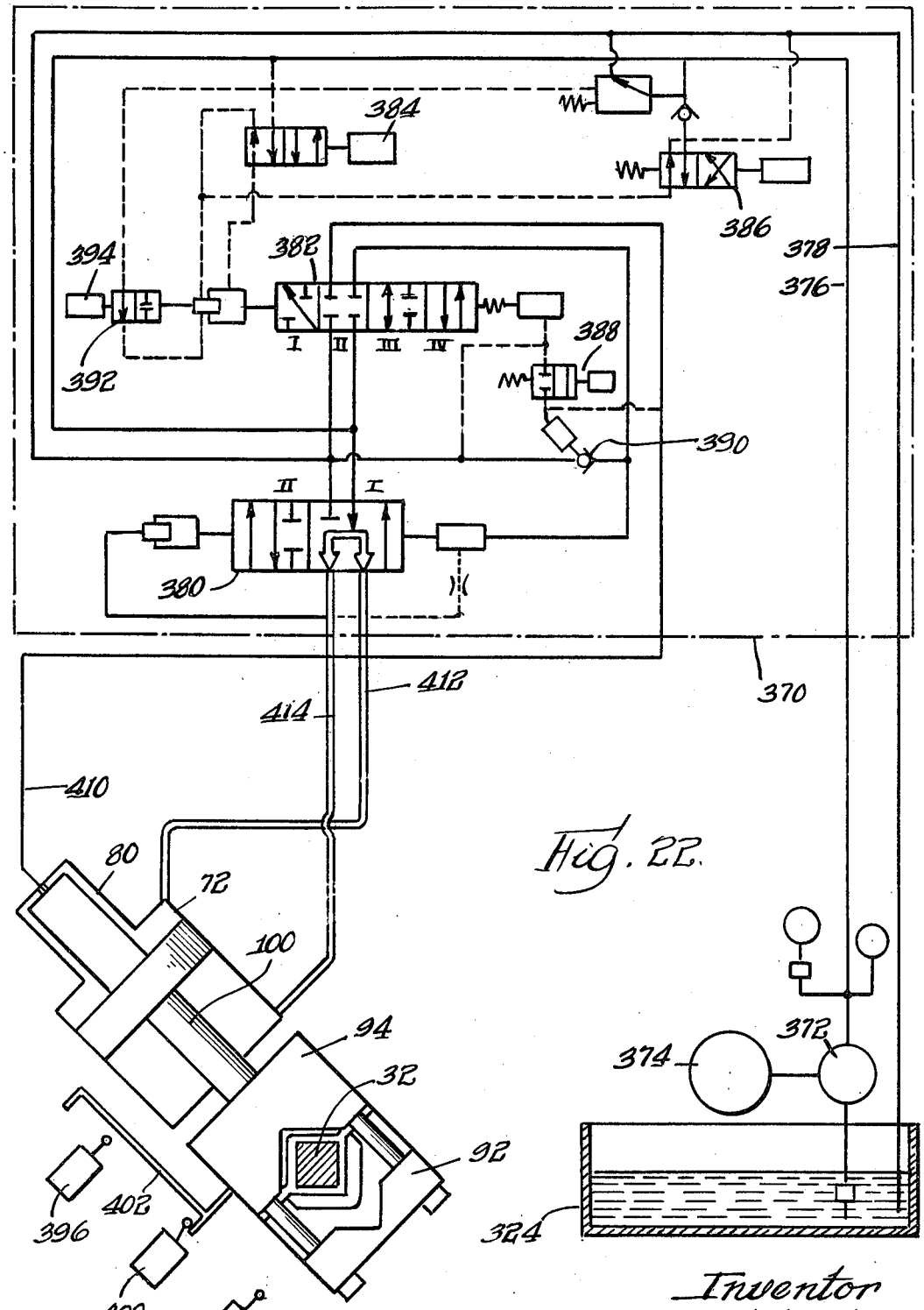

United States Patent Office 3,496,813
Patented Feb. 24, 1970

3,496,813
METHOD AND APPARATUS FOR SHEARING CONTINUOUS BILLETS
Raymond L. Valente, Kankakee, Ill., assignor to Manco Manufacturing Co., Bradley, Ill., a corporation of Illinois
Filed June 26, 1967, Ser. No. 648,627
Int. Cl. B23d 25/02; B26d 7/06
U.S. Cl. 83—26
19 Claims

ABSTRACT OF THE DISCLOSURE

There is disclosed a method and apparatus including a shear mounted for severing a billet diagonally and thereby pinching and pointing the end of the billet. The shear is mounted for synchronized advancement with a continuously moving billet. A table for receiving the severed portion of the billet is also mounted for synchronized movement and for diagonal movement corresponding to that of the shear.

---

The present invention relates to a novel method and apparatus for severing billets, and more specifically to a novel method and apparatus for shearing sections from continuously moving billets.

In processes such as the continuous casting of metal billets, it is necessary to sever sections of the desired length from the leading end of the billet while the billet is continuously advancing along a predetermined path of travel. In many instances, the severed billet sections are then inserted between rollers which serve to shape the billet to the desired cross-sectional thickness and width.

It is an important object of the present invention to provide a novel method and apparatus for severing sections from a continuously moving billet in an efficient and effective manner.

A further object of the present invention is to provide a novel method and apparatus for shearing sections of a continuously moving billet in a manner such that ends of the sections are pointed for facilitating subsequent entry between billet forming rolls.

Another object of the present invention is to provide a novel method and apparatus for severing successive sections from a continuously cast and moving billet in timed relationship with the movement of the billet so as to obtain sections of predetermined length and so as to avoid interfering with the casting operation.

Still another important object of the present invention is to provide a novel method and apparatus for diagonally shearing successive sections from a continuously moving billet and for continuously supporting each section as it is being severed from and displaced with respect to the remainder of the billet.

Still another object of the present invention is to provide a novel apparatus of the above described type which is of rugged and reliable construction.

Other objects and advantages of the present invention will become apparent from the following description and the accompanying drawings wherein:

FIGS. 1 and 1a comprise a side-elevational view showing an apparatus incorporating features of the present invention;

FIG. 3 is a view taken generally along line 3—3 in FIG. 2 and showing a shearing mechanism incorporated in the apparatus of the present invention;

FIG. 4 is a fragmentary view of a portion of the apparatus as seen along line 4—4 in FIG. 3;

FIG. 5 is a fragmentary view similar to FIG. 3 but showing the shear in a workpiece cutting position;

FIG. 6 is an enlarged fragmentary side elevational view showing an entering end portion of the apparatus;

FIG. 7 is a fragmentary view of a portion of the apparatus seen from along line 7—7 in FIG. 6;

FIG. 8 is a fragmentary view showing a portion of the apparatus as seen generally from along line 8—8 in FIG. 6;

FIG. 9 is a fragmentary view showing a portion of the apparatus as seen from along line 9—9 in FIG. 6;

FIG. 10 is a fragmentary plan view showing a portion of the table structure for receiving a severed section from a billet incorporated in the apparatus of the present invention;

FIG. 11 is a perspective view showing an end portion of a section of billet sheared and formed in accordance with the present invention;

FIG. 12 is a fragmentary enlarged sectional view showing a portion of the apparatus as seen along line 12—12 in FIG. 10;

FIG. 13 is an enlarged fragmentary sectional view showing a portion of the apparatus as seen along line 13—13 in FIG. 10;

FIG. 14 is a partially schematic side elevational view showing the manner in which a billet receiving table portion of the apparatus moves longitudinally and pivots downwardly during a shearing operation and specifically shows the table portion in solid lines in a retracted or starting position and in broken lines in an extended position at the completion of a shearing operation;

FIG. 15 is a simplified view of the movable table structure taken along line 15—15 in FIG. 14;

FIG. 16 is a partially schematic plan view of the table structure and respectively showing the structure in solid and broken lines at its retracted and extended positions;

FIG. 17 is a view similar to FIG. 15 but shows the structure in solid lines at its extended position at the completion of a shearing operation;

FIGS. 20, 21 and 22 are schematic diagrams showing a hydraulic actuating and control circuit incorporated in the apparatus of the present invention.

Figure 1:
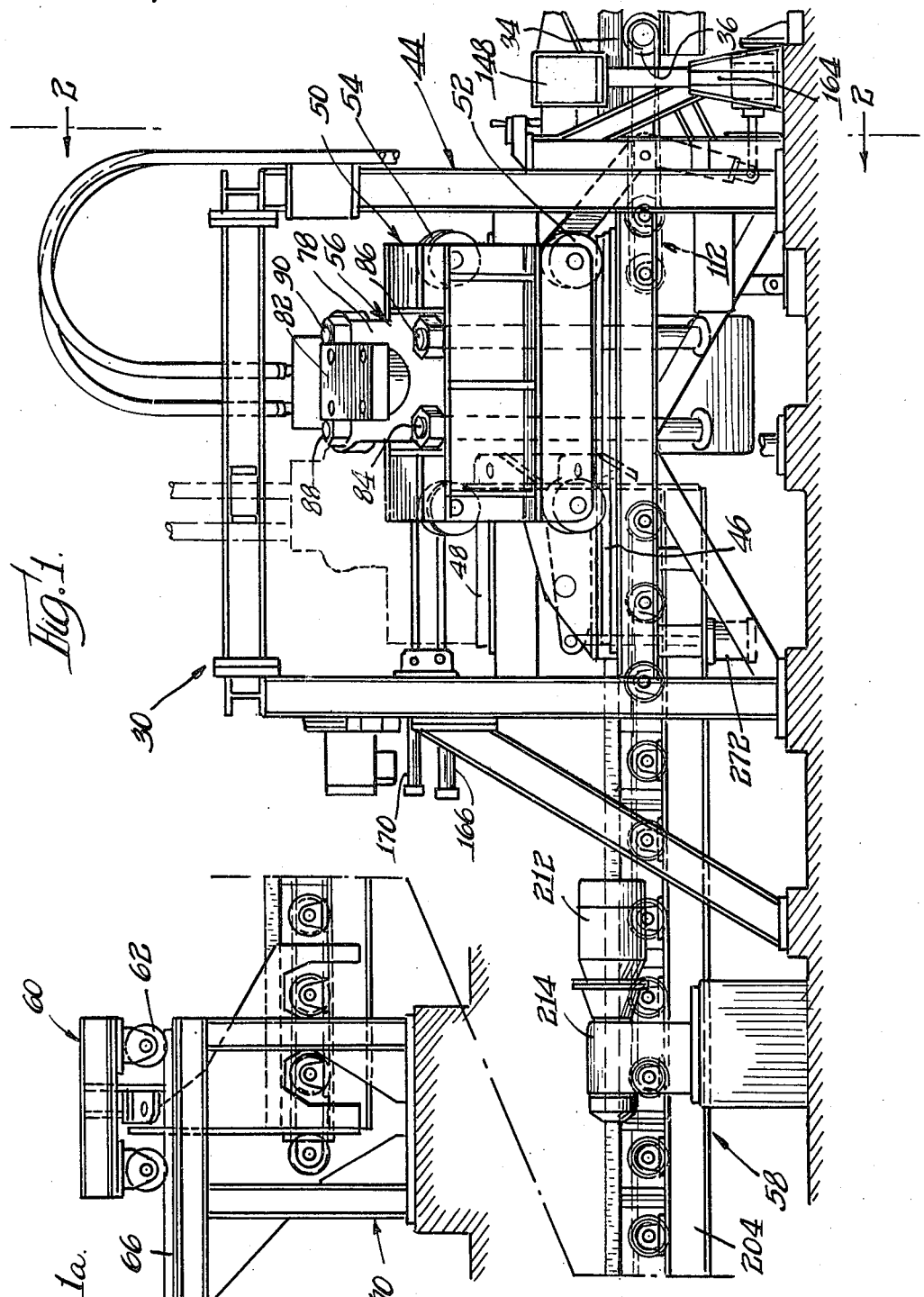
Figure 2:
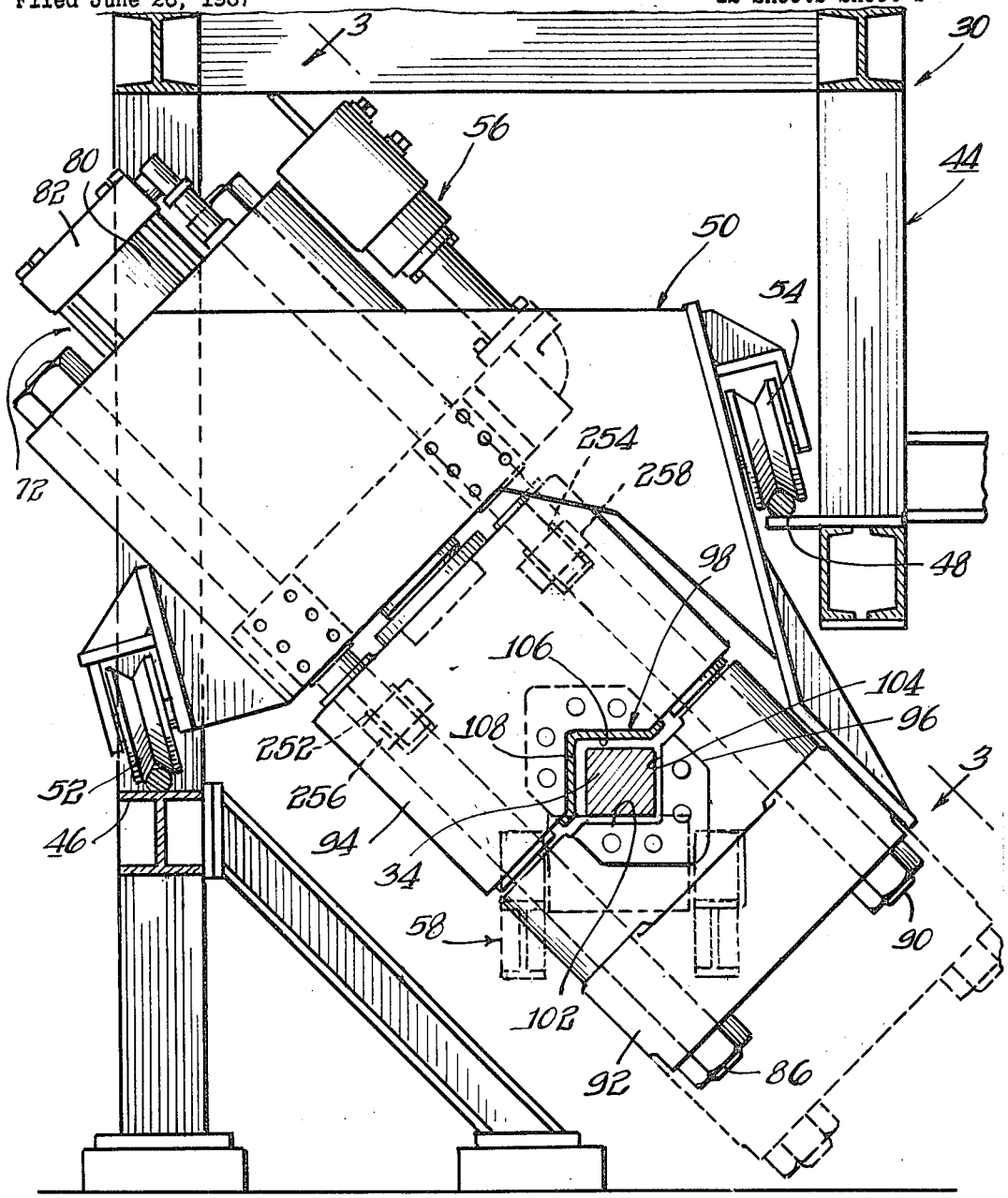
FIG. 2 is an enlarged fragmentary and simplified sectional view taken generally along line 2—2 in FIG. 1.
Figure 18:
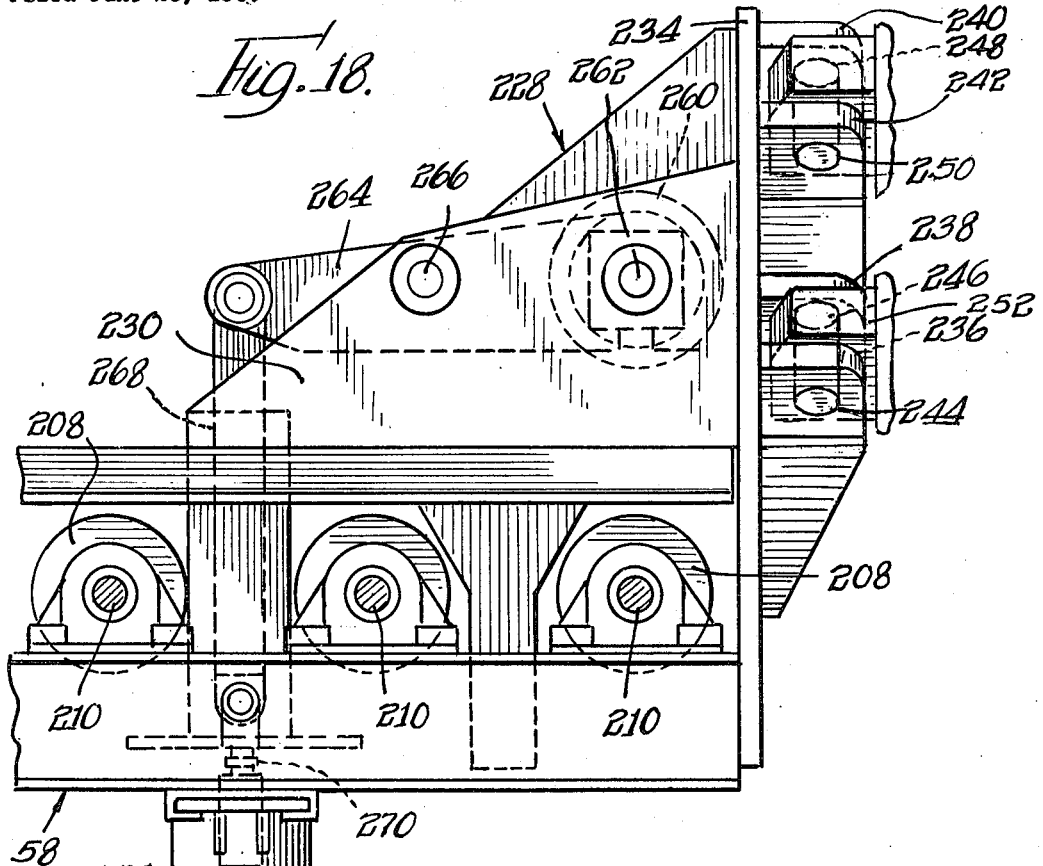
FIG. 18 is an enlarged fragmentary side elevational view showing an entering end portion of the movable billet receiving table structure incorporated in the apparatus.
Figure 19:
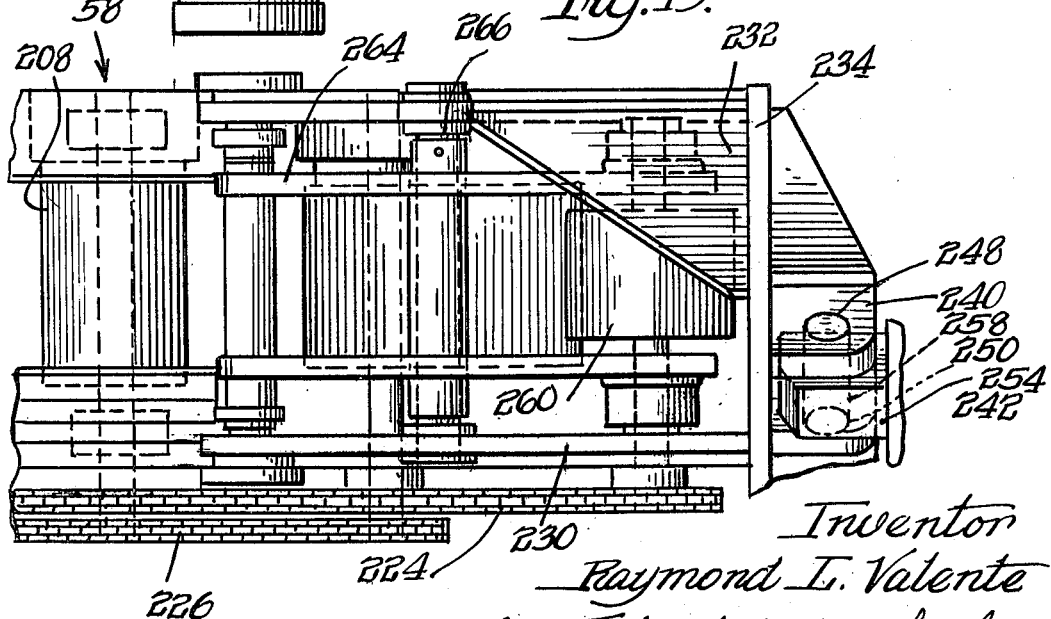
FIG. 19 is a plan view of the portion of the structure shown in FIG. 18.

Referring now more specifically to the drawings wherein like parts are designated by the same numerals throughout the various figures, an apparatus 30 incorporating features of the present invention is shown in FIGS. 1 and 2. While it is contemplated that the apparatus may be adapted for severing sections of various elongated workpieces moving continuously along a predetermined path of travel, it is particularly suitable for severing sections 32 from the leading end of a continuous billet 34 discharged from a conveyor 36 (see FIGS. 1 and 6) which is a part of a continuous casting installation of known construction. As shown in the drawings, the apparatus 30 is adapted to be positioned in alignment with the conveyor 36 and adjacent an endmost roller 38 of the conveyor which is supported by a suitably driven shaft 40 having a sprocket 42 thereon for a purpose described below.

In general, the apparatus 30 comprises a frame structure 44 mounted adjacent the end of the conveyor 36 and including tracks 46 and 48. A carriage 50 having wheels 52 and 54 engageable with the tracks 46 and 48 is mounted for reciprocable movement. The carriage supports a shear assembly 56 as shown in FIGS. 1–5, which shear assembly is adapted to sever successive sections 32 from the billet in the manner hereinafter set forth.

A table structure 58 is disposed in alignment with the carriage 50 for receiving and conveying sections 32 severed from the remainder of the billet. An upstream or entering end of the table structure is supported as will hereafter be described on a movable portion of the shear assembly and the downstream or discharge end of the table structure is supported by a carriage 60 having wheels 62 and 64 engaging track members 66 and 68 mounted on a suitable frame structure 70. The arrangement is such that the table structure 58 reciprocates with the carriage 50. In addition the upstream or entering end of the table structure moves up and down with the movable blade of the shear assembbly so as to permit displacement of the severed workpiece with respect to the remainder of the billet during the shearing operation.

As shown in FIGS. 1 through 5, the shear assembly comprises a two-stage double acting hydraulic cylinder 72. The cylinder has a relatively large diameter tube 74 disposed between and sealed to head and cap plates 76 and 78 respectively and a relatively small diameter tube 80 communicating with the large diameter tube through the cap plate 78 and having its outer end closed by an end cap or plate 82. The relatively heavy plates 76 and 78 are welded, bolted or otherwise secured to the frame structure of the carriage 50.

Pairs of parallel guide and connecting rods 84, 86, 88, and 90 are secured to and extend downwardly from the cylinder plates 76 and 78. An anvil 92 is carried by and fixed at the lower ends of the rods and a slide or shear blade holder 94 is slidably disposed on the rods between the anvil and the cylinder. A fixed shear blade 96 is removably secured to the anvil 92 and the complementary movable shear blade 98 is detachably connected to the slide 94. A piston 100 extends from the cylinder 72 and is connected with the slide 94 for actuating the shear blade 98 between the raised position shown in FIG. 3 and the lowered workpiece severing position shown in FIG. 5.

As shown best in FIG. 2, the shear assembly 56 is mounted on the carriage 50 at an angle of about 45° with respect to the horizontal and more specifically so that the movable blade 98 will be reciprocated in a direction extending diagonally with respect to the billet conveying means including the table structure 58. Furthermore, the shear blade elements 96 and 98 have a V-shaped configuration. Thus, the blade element 96 has a substantially horizontal shearing edge 102 and a vertical shearing edge 104 adapted to engage the bottom and the righthand side of the billet 34 as viewed in FIG. 2. Similarly, the blade element 98 is formed with a generally horizontally extending edge 106 and a vertically extending edge 108 engageable with the top and lefthand side of the billet. With this construction and with the movable blade 98 advancing along a path of travel extending diagonally of the billet 34, it will be noted that the billet will be completely encircled by and engaged on all sides by the shearing edges of the complementary shearing blades. As a result, a pinching action takes place so as to form the ends of the severed billets with pointed portions 110 as shown in FIG. 11. As indicated, the pointed end portions 110 have inclined or beveled surfaces extending from all sides of the billet. As previously indicated, the pointed formation of the billet ends facilitates subsequent entry of the billets between reducing or forming rollers.

The apparatus is provided with means for actuating the shear after a predetermined length of the billet has passed between the opened shear blades. The operation is such that the carriage and thus the shear assembly moves along the billet path of travel at the same speed as the billet so as to prevent improper interference between the billet and the shear blades during the shearing operation.

The mechanism for controlling operation of the shear in accordance with movement of the billet is shown in FIGS. 1 and 6 through 9. The mechanism comprises a short conveyor 112 at the inlet end of the apparatus and adjacent the conveyor 36 which, as indicated above, may be the discharge conveyor of a continuous casting installation. The conveyor 112 is adapted to receive the billet from the conveyor 36 and to feed the billet at the same rate as the conveyor 36. Thus, the conveyor 112 comprises a plurality of rollers 114 fixed on shafts 116 rotatably supported by suitable bearings 118 on a frame 120. The rollers are driven in timed relationship with the conveyor 36 by a chain 122 encircling the aforementioned sprocket 42 on the shaft 40 and a similar sprocket 124 on a shaft 116. The rollers 114 are driven in unison through a chain 126 which encircles sprockets 128 on their respective shafts 116.

The frame structure 120 of the conveyor 112 has one end slidably supported on a shelf 130 and an opposite end supported by links 132 and 134. An upper end of the link 132 is pivoted by a pin 136 to the frame structure 120 and a lower end of the link 134 is retained by a pivot 138. Adjacent ends of the links 132 and 134 are connected to pivot pin 140 which is connected with a piston rod 142 yieldably biased by pneumatic cylinder 144 for maintaining the drive chain 122 between the conveyor 36 and the sprocket 124 under the desired tension.

In order to measure a predetermined length of the billet and actuate the shear assembly in accordance with such length, an electronic counter 146 (see FIG. 21) of known construction is electrically connected with solenoid-operated control valve means for the shear as will be described more fully below. An electrical impulse generator 148, also of known construction is electrically connected with the counter 146 by a cable 150 and is driven through a flexible shaft or coupling 152 (see FIG. 8). The flexible shaft or coupling 152 is connected to and driven by a shaft 154 which carries a roller 156 that rides on top of and is driven by the billet. The roller shaft 154 is rotatably mounted in bearings 158 carried by arms 160 pivoted on shaft 162. The electrical impulse generator may be conveniently supported on a stand 164 mounted on the floor adjacent the main frame of the apparatus.

A hydraulic cylinder 166 and cooperating piston 168 are connected between the main frame 44 and the shear carriage 50 for actuating or feeding the carriage along the path of travel of the billet and a second cylinder 170 and cooperating piston 172 are similarly connected between the frame and the carriage for providing a back pressure and aiding in positively controlling the movement of the carriage in the manner described below.

In order to synchronize the feeding movement of the carriage 50 with the rate of movement of the billet, means is provided for delivering actuating fluid to the cylinder 166 at a rate proportionate to the speed of the billet. This means is shown in FIGS. 6 and 7 and schematically in FIG. 21 and comprises a roller 174 adapted to engage and to be driven by the billet. The roller is carried by shaft 176 which is rotatively supported between bellcrank shaped lever arms 178 pivotally supported intermediate their ends on shaft 180. Lower ends of the lever arms 178 are connected with piston rod 182 adapted to be biased by an air cylinder 184 in a counterclockwise direction as viewed in FIG. 6 for positively pressing the roller 174 against the upper surface of the billet to insure the desired driving traction.

The shaft 176 of the roller 174 is connected by a coupling 186 with an input shaft 188 of a harmonic drive unit 190. Such units are of known and commercially available construction and need not be described in detail. It suffices to state that the unit 190 has an output shaft 192 and the unit is constructed and arranged as a speed increaser or, in other words, so that the shaft 192 is driven at a relatively high speed as compared with the input shaft 188. The high speed shaft 192 in turn drives an input shaft 194 of a hydraulic pump 196 through sprockets 198 and 200 and a drive chain 202. The pump 196 is thus driven in timed relationship with respect to the movement of the billet so as to deliver hydraulic fluid to the carriage actuating cylinder 166 for actuating the carriage in timed relationship with the movement of the billet.

In accordance with an important feature of the present invention, the table structure 58 is constructed and mounted for movement in unison with the shear carriage 50 and also in unison with the movable shear blade during a shearing operation so as to provide continuous support for the length of the billet being severed. The table and conveyor structure 58 is shown best in FIGS. 1, 10 and 12–19 and includes longitudinally extending frame members or rails 204 and 206. Rollers 208 are mounted at intervals along the rails on shafts 210 supported in suitable bearings. The rollers 208 are driven in unison and at a rate at least equal to and preferably slightly faster than the rate at which the continuous billet is fed into the apparatus.

As shown in FIGS. 1 and 10, an electric motor 212 is mounted adjacent the conveyor table structure 58 and is operatively connected to a speed reducing transmission 214. The transmission 214 has an output shaft 216 connected by a flexible and extendible drive shaft means 218 to one of the roller shafts 210 located intermediate the ends of the conveyor table structure. The remainder of the roller shafts 210 are driven from this intermediate shaft through inner and outer sprockets 220 and 222 mounted on each shaft and chains 224 and 226 respectively extending between pairs of adjacent inner and pairs of adjacent outer sprockets as shown best in FIG. 10.

As previously indicated, the table conveyor or structure 58 is mounted for movement in unison with the shear. More specifically, an upstream or entering end portion of the structure 58 incorporates bracket or hinge means 228. This hinge means comprises upstanding and diagonally extending side plates 230 and 232 secured to the opposite side rails 204 and 206 and welded to a suitably formed end plate 234. Pairs of ears 236 and 238 and 240–242 are welded to the end plate 234 and having axially aligned apertures 244, 246, 248 and 250. The arrangement is such that the common axis of these apertures extends diagonally with respect to the generally horizontal tabletop or effective plane provided by the upper surfaces or edges of the rollers 208. The hinged conection between the table structure and the shear is completed by providing apertured ears 252 and 254 welded or otherwise secured to the slide 94 of the shear and adapted to be aligned with the previously mentioned apertured ears for receiving pivot or hinge pins 256 and 258 as shown in FIGS. 2, 3, 4 and 12.

In order to confine and retain the section of a billet on the table and conveyor structure 58 during a shearing operation, a pressure roller 260 is disposed at the entering end portion of the table between the aforementioned side plates 230 and 232. The pressure roller is carried on a shaft 262 mounted between a pair of arms 264 which are pivoted intermediate their ends on a shaft 266. The arms are biased in a clockwise direction as viewed in FIG. 18 in order to urged the roller against the billet by means of a push rod 268 which is actuated by a piston 270 and a complementary air cylinder 272.

The downstream or discharge end of the table and conveyor structure 58 is, as previously indicated, supported by the carriage 60. This portion of the structure is shown best in FIGS. 1a, 10 and 13 and comprises hinge means including side plates 274 and 276 secured to and extending upwardly from the side rails 204 and 206 and supporting a diagonally disposed plate 278. First aperture ears or bearing elements 280 and 282 are secured to the plate 278 in alignment with pairs of apertured ears or bearing elements 284–286 and 288–290 which are fixed to a plate 292 mounted on a bracket 294 secured to and depending from the carriage 60. Pivot pins 296 and 298 extend through the aligned apertured ears or bearing elements for completing the hinged connection between the table structure 58 and the carriage 60.

With the table structure 58 supported in the manner described above, movement in unison with the movable shear takes place as shown somewhat diagrammatically in FIGS. 14–17. In FIG. 14, the solid line position of the table structure 58 is the retracted or starting position in which the table is at substantially the same level as that of the incoming billet and the movable shear is completely raised and the shear carriage 50 is in its completely retracted position. The broken line position in FIG. 14 shows the manner in which the table moves longitudinally with the shear carriage and at the same time shows how the upstream or entering end of the table and conveyor structure 58 moves downwardly as the movable portion of the shear moves downwardly. FIG. 16 shows the horizontal component of this movement and FIGS. 15 and 17 show the actual diagonal direction of the movement of the entering or upstream end of the table or conveyor structure 58 between its fully raised and retracted position and its fully depressed and extended position.

In FIGS. 20–22 there is shown, in simplified form, an actuating and control system and circuit incorporated in the apparatus. While not all details of the pneumatic, hydraulic and electric circuits are shown, it is to be understood that such details may be provided by conventional and commercially avaliable components connected and installed in accordance with various known procedures for accomplishing the desired functions.

Air under pressure is supplied from a reservoir 300 or any other suitable source to the air cylinders 144, 184 and 272. An air pressure or supply line 302 extends from the source and is connected with the air cylinders through spring biased solenoid-operated valves 304, 306 and 308 connected in suitable branch conduits 310, 312 and 314. Exhaust lines 316, 318 and 320 are also connected between the air cylinders and the aforementioned solenoid valves, which valves have exhaust ports suitably connected with a common exhaust line 322. Suitable electrical circuitry which need not be shown is provided for energizing the solenoid valves for admitting air under pressure to the air cylinders during operation of the apparatus so that the rollers 174 and 260 are continuously biased against the billet and the piston 142 is continuously biased for maintaining the desired tension in the drive chain 122.

The hydraulic circuitry of the apparatus comprises a reservoir 324 connected with pumps 326 and 328 suitably driven by an electric motor 330 as shown in FIG. 21. The pumps 326 and 328 are respectively connected by conduits 332 and 334 with an inlet of the pump 196 described hereinabove and an inlet of a synchronizing control valve structure 336 which controls advancement and retraction of the shear carriage 50. An outlet of the pump 196 is connected by a conduit 338 with another inlet of the valve structure 336 and a drain line 340 extends between the valve structure and the reservoir 324. A conduit 342 extends from one port of the valve structure 336 and is connected by branch conduits 344 and 346 with ends of the cylinders 166 and 170. The opposite or rod ends of the cylinders are respectively connected with the valve structure by conduits 348 and 350. Referring to FIG. 20, the valve structure 336 which is schematically shown includes a three-position main spindle or valve spool 352, and pilot valves 354 and 356 associated with the main spool. A solenoid 358 electrically connected by suitable wires, not shown, with the previously described electronic counter 146 serves to actuate a spring-biased valve 360. Another solenoid 362 is included for actuating the spring-biased valve 364 as described below. An additional normally closed pilot valve 366 is included for selectively opening a restricted passageway to the drain line and another pilot valve 368 is incorporated in the structure for selectively opening and closing a passageway.

The construction of the control valve 336 and the hydraulic circuitry is such that when the system is in the condition shown in FIG. 20 with the main spool 352 in the No. 1 position, hydraulic fluid under pressure is maintained in the head end of both cylinders 166 and 170 and the shear carriage 50 is thus retained in its retracted position. When the desired length of the billet has passed through the shear, the electronic counter 146 sends a signal causing solenoid 358 to be actuated for shifting the main spool 352 to its second position and thereby directing hydraulic fluid from the pressure source and from pump 196 to the rod end of the cylinders 166 and 170 in a manner for causing feeding or traversing movement of the carriage 50 in timed relationship with respect to the advancing billet. The construction of the control valve is such that a back pressure is maintained in the cylinders so that positive control over the advancement of the carriage is obtained. At the completion of the shearing operation as described further below, a limit switch is actuated which energizes solenoid 362 which causes the valves to operate for shifting the main spool 352 to its third position which results in an increased volume of actuating fluid being directed to the rod ends of the cylinders for increasing the traverse rate of the carriage 54 to advance the shear blades slightly ahead of the billet. The movable shear blade can then be raised without frictional interference with the billet and when the blade has been raised sufficiently, the limit switch is actuated also as described below, for deenergizing the solenoids and permitting the spring-biased spool 352 to be returned to its No. 1 position for directing hydraulic fluid to the cylinders 166 and 170 so as to return the carriage 50 to its starting position.

The control system further comprises a valve structure 370 as shown schematically in FIG. 22 for controlling the operation of the movable shear. Actuating fluid is supplied to the valve structure 370 from the hydraulic reservoir 324 by a pump 372 driven by a suitable motor 374. A conduit 376 extends from the pump to the valve structure and a drain conduit 378 return from the valve structure to the reservoir.

The valve structure 370 is mounted in association with the shear assembly 56 as shown in FIGS. 3 and 4. As indicated schematically in FIG. 22, the valve assembly comprises a two-position main spool 380 and a four-position directional spool 382. Solenoid valves 384 and 386 are included for the purpose described below as are a pilot valve or spool 388 and a sequence popit 390. A vent spool 392 is also included and is adapted to be mechanically actuated in one direction by a rod 394 carried by the shear slide 94 as shown in FIG. 3. The rod 394 also serves to locate the directional spool 382 in the No. 2 position shown in FIG. 22, in which position the movable shear blade is fully retracted. Limit switches 396, 398 and 400 are suitably mounted adjacent the shear assembly for controlling operation of certain of the solenoid valves, which limit switches are adapted to be engaged and operated by dogs carried on a rod 402 which is secured to and movable with the shear slide 94 as shown in FIGS. 3 and 4. Additional limit switches 404, 406, 408 are provided as schematically shown in FIG. 21 for aiding in the control of the shear blade and the carriage 50.

The various limit switches are connected by electric circuitry which need not be shown in detail but which is such that operation of the shear is accomplished in the following manner. As previously indicated, the shear carriage 50 begins to advance when the electronic counting device causes the solenoid valve 358 of the valve structure 336 to be energized. After a predetermined short forward advance of the carriage 50, the limit switch 404 is actuated and this causes the solenoid valves 384 and 386 of the shear control valve structure 370 to be energized. Upon actuation of these solenoid valves, the vent passageway of the valve structure 370 is blocked and the directional spool 382 is shifted from its No. 2 position to its No. 1 position so that fluid under pressure is directed through conduit 410 to the upper relatively small diameter end of the shear cylinder portion 80. At the same time fluid under pressure is directed through the main valve spool 380 and through lines 412 and 414 to both the upper and lower ends of the relatively large diameter shear cylinder portions 72, the differential between the effective areas of the upper end of the shear actuating piston and the lower end thereof causes relatively rapid downward feeding movement of the shear.

Upon engagement of the shear with a billet, system pressure builds up because of the resistance created by the billet and the pilot spool of sequence valve 388 shifts and sequence popit valve opens to allow the main spool 380 to shift to its No. 2 position. In this position of the main spool, fluid under pressure is directed only to the upper end of the shear cylinder and the conduit 414 is connected with the vent line so that maximum force is brought to bear to accomplish the shearing action.

When the section has been cut a predetermined amount which, for example, might be on the order of one-third of the distance through the billet, limit switch 396 is actuated. This causes solenoid valve 384 to be deenergized and the pilot pressure which has been keeping the directional spool in the No. 1 position is relieved and the spring action biasing the directional spool causes it to assume the No. 3 position. In this position fluid under pressure from the pump is still directed into the upper end of the relatively large cylinder portion 72 but the lower end of the large cylinder is now connected with the upper end of the relatively small cylinder portion for reducing the volume of fluid which must be supplied by the pump and permitting more rapid cutting action.

Shortly after completion of the shearing action, the limit switch 398 is actuated so as to cause solenoid valve 386 to be deenergized. The spring action on the directional spool 382 then causes it to assume the No. 4 position allowing pump oil under pressure to be directed to shift the main spool 380 back to its No. 1 position and further connecting the upper end of the small diameter cylinder through the conduit 410 with the drain line. The differential between the areas of the piston against which fluid under pressure is now directed causes the shear to be raised or returned to its starting position. When the shear is fully open, limit switch 400 is actuated which signals the shear carriage control valve 336 to initiate the return traverse as described hereinabove and finally when the shear has returned to its extreme up position and the carriage has been fully retracted, limit switch 408 is actuated and pushrod 394 returns the directional spool to the No. 2 position so that the system is ready for the next cycle.

While a preferred embodiment of the present invention has been shown and described herein, it is obvious that many structural details may be changed without departing from the spirit and scope of the appended claims.

The invention is claimed as follows:

1. An apparatus for severing a workpiece comprising means for feeding a section of a workpiece past a work station, a table structure for receiving and supporting said workpiece section, severing means at said work station for severing said section from the remainder of the workpiece and for displacing said section laterally as an incident to the severing operation, means mounting said table structure for lateral movement for providing continuous support for said section during the severing operation.

2. An apparatus, as defined in claim 1, wherein said table structure comprises a conveyor for moving the severed section away from said work station.

3. An apparatus, as defined in claim 2, which includes means mounting said severing means and said table structure for movement longitudinally with the workpiece during a severing operation.

4. An apparatus, as defined in claim 3, wherein said severing means includes an element movable transversely of a workpiece during a severing operation, said table structure being connected to and movable with said element.

5. An apparatus, as defined in claim 4, wherein said severing means comprises a shear and said movable element comprises a movable shear blade.

6. An apparatus, as defined in claim 5, wherein said movable shear blade is mounted for generally diagonal movement with respect to said workpiece feeding means for generally diagonally shearing the workpiece.

7. An apparatus, as defined in claim 6, which includes pivot means pivotally connecting one end of said table structure with said movable element of the shearing means, said apparatus including pivot means supporting an opposite end of said table structure.

8. An apparatus, as defined in claim 1, which includes means mounting said severing means for movement along a path of tarvel of the workpiece, and means responsive to movement of the workpiece for advancing the severing means along said path of travel in timed relationship with said workpiece during a severing operation.

9. An apparatus, as defined in claim 8, wherein said means for advancing said severing means comprises actuating means including a pump, a roller engageable with and driven by said workpiece, and speed increasing means connected with and driven by said roller and also connected with and driving said pump.

10. An apparatus, as defined in claim 8, wherein said severing means comprises a shear disposed diagonally with respect to said path of travel for generally diagonally shearing the workpiece, said shear including opposed complementary shearing blades respectively comprising diverging edge portions for substantially encircling a workpiece during a shearing operation.

11. An apparatus for severing a section from a workpiece comprising means for directing a continuously moving workpiece along a path of travel, severing means mounted for movement along said path of travel for severing the continuously moving workpiece and for laterally displacing a section of the workpiece being severed from the remainder of the workpiece as an incident to the severing operation, means responsive to movement of the workpiece for actuating said severing means in timed relationship with the movement of the workpiece, and a table structure movable with said severing means for receiving a section severed from the remainder of the workpiece and means mounting said table structure for lateral movement for providing continuous support to said section during the severing operation.

12. An apparatus for severing a section from a workpiece comprising means for directing a continuously moving workpiece along a path of travel, severing means mounted for movement along said path of travel for severing the continuously moving workpiece, means responsive to movement of the workpiece for actuating said severing means in timed relationship with the movement of the workpiece, a table structure movable with said severing means for receiving a section severed from the remainder of the workpiece, a carriage supporting said severing means and mounted for reciprocable movement along said path of travel, and said means for actuating the severing means in timed relationship with movement of the workpiece comprising means for advancing the carriage at substantially the same speed as said workpiece during a severing operation and for increasing the speed of the carriage means upon completion of the severing operation and then retracting the severing means.

13. An apparatus for severing a section from a workpiece comprising means for directing a continuously moving workpiece along a path of travel, severing means mounted for movement along said path of travel for severing the continuously moving workpiece, means responsive to movement of the workpiece for actuating said severing means in timed relationship with the movement of the workpiece, a table structure movable with said severing means for receiving a section severed from the remainder of the workpiece, a carriage mounted for reciprocable movement along said path of travel, said severing means comprising a shear assembly mounted on said carriage and comprising means including a shear blade movable diagonally of said workpiece and said path of travel for generally diagonally shearing said workpiece and generally diagonally displacing an end of the severed section from the remainder of the workpiece, pivot means connecting one end of said table structure with said last named means for diagonal movement therewith, a second generally reciprocable carriage suppoting an opposite end of said table structure, and pivot means connecting said opposite end of the table structure with said second carriage.

14. An apparatus, as defined in claim 13, wherein said table structure comprises roller means for conveying a severed section away from the shear means.

15. An apparatus, as defined in claim 11, wherein said means for actuating said severing means comprises measuring means for initiating operation of the severing means after a predetermined length of the workpiece has been advanced.

16. An apparatus for severing a section from a workpiece comprising means for directing a continuously moving workpiece along a path of travel, severing means mounted for movement along said path of travel for severing the continuously moving workpiece, means responsive to movement of the workpiece for actuating said severing means in timed relationship with the movement of the workpiece, a table structure movable with said severing means for receiving a section severed from the remainder of the workpiece, said severing means comprising a shear assembly including an anvil blade member and a slide carrying a movable blade member, said movable blade member being positioned downstream of said path of travel from said anvil blade member and causing displacement of a workpiece section being severed from the remainder of the workpiece during a severing operation, and means interconnecting said table structure with said slide for movement therewith for providing continuous support for a section being severed.

17. A method of severing a section from an elongated workpiece moving continuously along a predetermined path of travel comprising engaging said workpiece substantially entirely around its periphery with opposed shearing blade elements moving all of the shearing blade elements along said path of travel with the continuously moving workpiece, simultaneously moving one of said blade elements transversely of said path of travel for shearing the workpiece and laterally displacing the section being severed with respect to the remainder of the workpiece, and continuously supporting said section during the shearing operation.

18. A method, as defined in claim 17, comprising the step of forming a pointed end portion on said section during shearing of the section from the remainder of the workpiece.

19. A method as defined in claim 18, wherein said workpiece has a rectangular cross-sectional configuration and said one shearing blade is advanced diagonally of said cross-section during the shearing of said section.

References Cited
UNITED STATES PATENTS

| | | | |
|---|---|---|---|
| 2,327,921 | 8/1943 | Moohl | 83—158 |
| 2,808,104 | 10/1957 | Peterson | 83—320 |
| 3,224,310 | 12/1965 | Bieri | 83—157 |
| 3,238,827 | 3/1966 | Weidner et al. | 83—318 X |
| 3,253,490 | 5/1966 | Bodnar | 83—320 X |
| 3,391,918 | 7/1968 | Lotz | 83—157 X |

FOREIGN PATENTS 3,340    3/1880    Great Britain.

WILLIAM S. LAWSON, Primary Examiner

U.S. Cl. X.R.

83—37, 156, 158, 293, 320, 694